United States Patent
Morris et al.

(10) Patent No.: US 10,636,319 B2
(45) Date of Patent: Apr. 28, 2020

(54) ADAPTIVE WRITING UTENSIL

(71) Applicant: Two Sparrows Learning Systems, Inc., Erie, PA (US)

(72) Inventors: Nancy M. Morris, Erie, PA (US); Davide Piovesan, Erie, PA (US)

(73) Assignee: Two Sparrows Learning Systems, Inc., Erie, PA (US)

( * ) Notice: Subject to any disclaimer, the term of this patent is extended or adjusted under 35 U.S.C. 154(b) by 0 days.

(21) Appl. No.: 15/330,994

(22) Filed: Apr. 20, 2018

(65) Prior Publication Data

US 2019/0122575 A1 Apr. 25, 2019

Related U.S. Application Data

(60) Provisional application No. 62/488,348, filed on Apr. 21, 2017.

(51) Int. Cl.
*G09B 11/02* (2006.01)
*B43K 23/016* (2006.01)
(Continued)

(52) U.S. Cl.
CPC .......... *G09B 11/02* (2013.01); *B29C 33/0022* (2013.01); *B29C 67/241* (2013.01); *B43K 23/004* (2013.01); *B43K 23/008* (2013.01); *B43K 23/016* (2013.01); *B29C 45/26* (2013.01); *B29C 2045/2683* (2013.01)

(58) Field of Classification Search
CPC ...... B43K 19/00; B43K 19/003; B43K 19/02; B43K 19/12; B43K 19/145; B43K 23/00; B43K 23/001; B43K 23/004; B43K 23/008; B43K 23/012; B43K 23/016; B43K 23/02; B43K 5/005; B43K 7/005; B43K 8/003; B43K 27/003; B43K 27/006; B43K 27/04; G09B 11/02
USPC ...... D19/117, 120, 137, 138, 148, 184, 199, D19/203
See application file for complete search history.

(56) References Cited

U.S. PATENT DOCUMENTS

| | | | | |
|---|---|---|---|---|
| 249,893 A | * | 11/1881 | Bulkeley | A45D 40/0081 401/88 |
| 564,178 A | * | 7/1896 | Ahrens | B43K 23/004 15/443 |

(Continued)

OTHER PUBLICATIONS

KrazyKoolKrayons; "Cross Crayons, Easter Crayons, Church Crayons, Party Crayons, Easter Egg, Easter Basket, Easter Party, Party Favors, Church Party, Baptism"; Available at least by Mar. 18, 2016; https://www.etsy.com/sg-en/listing/269580454/cross-crayons-easter-crayons-church (Year: 2016).*

(Continued)

*Primary Examiner* — David J Walczak
*Assistant Examiner* — Bradley S Oliver
(74) *Attorney, Agent, or Firm* — The Webb Law Firm

(57) ABSTRACT

A writing utensil adapted for promoting the development of a tripod writing grip includes an elongate body having a substantially polygonal cross section, and having three faces extending between a proximal end and a distal end thereof, and a boss member extending from an intermediate portion of the elongate body, the boss member being adapted for impeding a user's fingers from sliding along a longitudinal axis of the elongate body.

18 Claims, 4 Drawing Sheets

(51) Int. Cl.
*B43K 23/008* (2006.01)
*B29C 67/24* (2006.01)
*B43K 23/004* (2006.01)
*B29C 33/00* (2006.01)
*B29C 45/26* (2006.01)

(56) References Cited

U.S. PATENT DOCUMENTS

| | | | | |
|---|---|---|---|---|
| 569,936 | A * | 10/1896 | Potter | B43K 23/001 401/131 |
| 2,785,654 | A * | 3/1957 | Lundberg, Sr. | B43K 23/016 401/93 |
| 2,845,047 | A * | 7/1958 | McKendree | B43K 23/004 401/6 |
| D189,170 | S * | 11/1960 | Lovejoy | D19/199 |
| 3,729,269 | A * | 4/1973 | Koeln | B43K 7/00 401/209 |
| 3,933,708 | A * | 1/1976 | Brinkman | C08L 91/08 523/164 |
| 4,030,841 | A * | 6/1977 | Balasty | B43K 23/00 401/6 |
| 4,991,985 | A * | 2/1991 | Laipply | B43K 23/008 15/425 |
| 5,318,372 | A * | 6/1994 | Besthorne | B43K 27/02 15/105.51 |
| 5,411,344 | A * | 5/1995 | Gagne | B43K 5/005 401/192 |
| 5,558,452 | A * | 9/1996 | Oka | B43K 23/008 401/6 |
| D403,355 | S * | 12/1998 | Fillion | D19/120 |
| 6,402,407 | B1 | 6/2002 | Goldstein | |
| 6,505,984 | B2 * | 1/2003 | Smith | B43K 19/00 15/424 |
| 6,851,883 | B1 * | 2/2005 | Lamond | B43K 8/02 401/198 |
| 6,887,006 | B1 * | 5/2005 | Carpenter | A45C 11/36 206/214 |
| 6,913,405 | B2 * | 7/2005 | Fischer | A45D 34/04 220/669 |
| D553,188 | S | 10/2007 | DaBoll | |
| 7,789,580 | B2 * | 9/2010 | Cheng | B43K 23/008 401/6 |
| 9,061,541 | B2 * | 6/2015 | Elmore | B43K 8/003 |
| 9,676,225 | B2 * | 6/2017 | Quiroz-Ziebart | B43K 19/003 |
| 9,764,590 | B2 * | 9/2017 | Lowrey, Jr. | B43K 8/003 |
| 2006/0124487 | A1 * | 6/2006 | Brown | B43K 23/001 206/371 |
| 2010/0289282 | A1 * | 11/2010 | Avery, Jr. | A61F 4/00 294/25 |
| 2012/0039653 | A1 * | 2/2012 | Fischer | B43K 8/003 401/6 |
| 2012/0285029 | A1 * | 11/2012 | Jung | B43K 19/14 33/483 |
| 2017/0197455 | A1 * | 7/2017 | Liu | B43K 23/08 |
| 2018/0072092 | A1 * | 3/2018 | Hilton Dunne | A46B 5/023 |
| 2018/0272443 | A1 * | 9/2018 | Collins | B44B 3/04 |
| 2019/0092085 | A1 * | 3/2019 | Michel Bodie | B43K 24/04 |

OTHER PUBLICATIONS

YouTube, Eyecan Social Art Creator, "Project 'EYECAN'—The Film", https://www.youtube.com/watch?time_continue=23&v=yL04nWCF4fs, Mar. 19, 2013, last accessed Jan. 25, 2019.

* cited by examiner

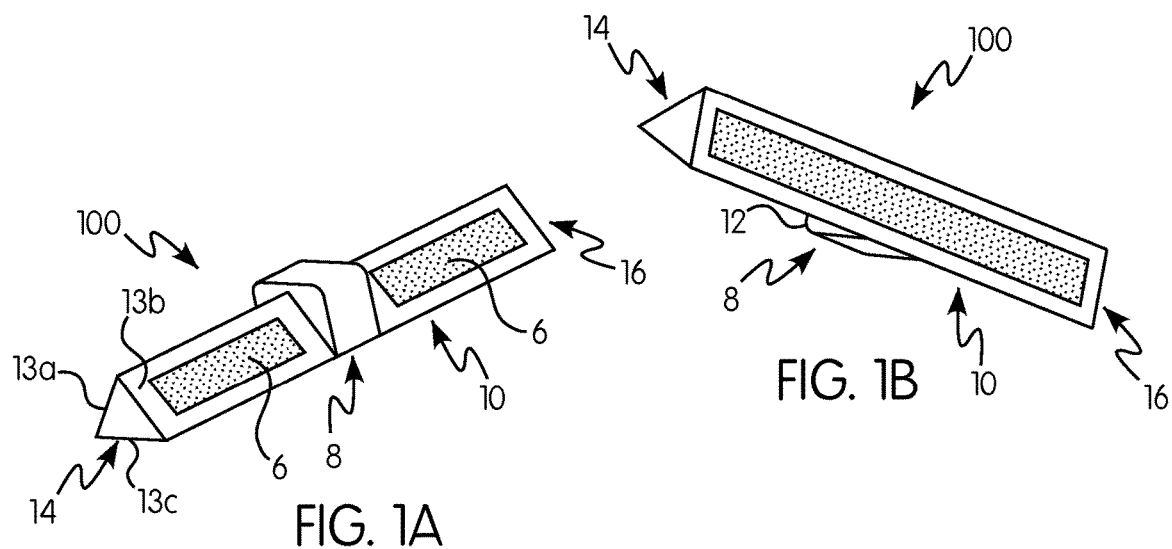
FIG. 1A
FIG. 1B
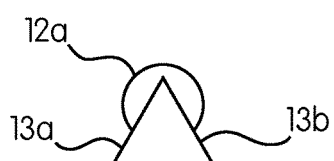
FIG. 2A
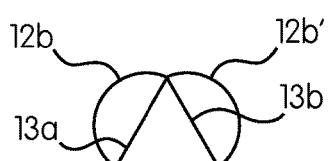
FIG. 2B
FIG. 2C
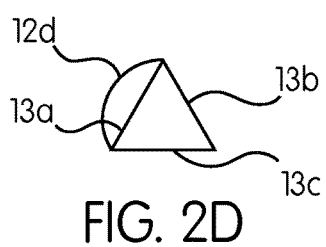
FIG. 2D
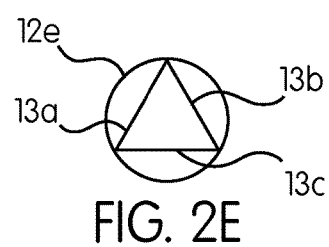
FIG. 2E
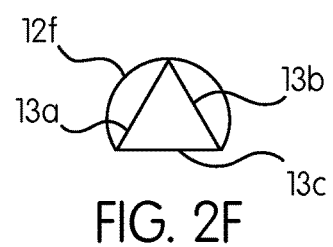
FIG. 2F
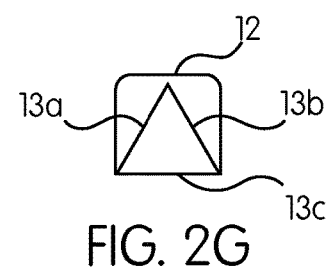
FIG. 2G

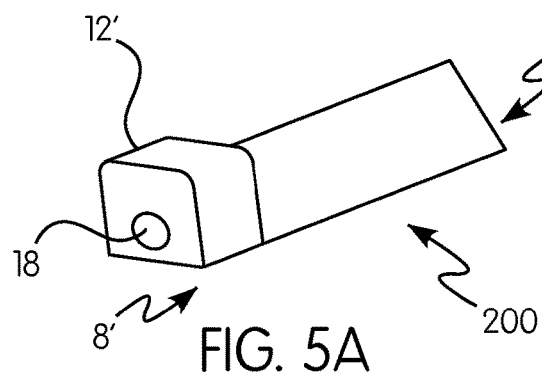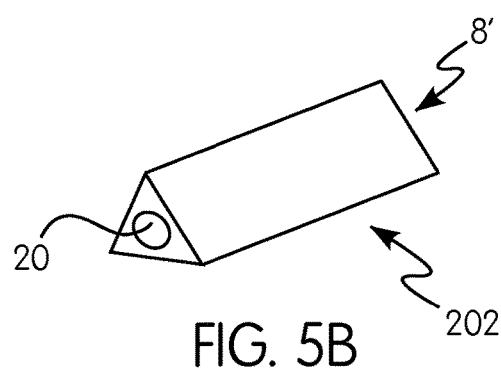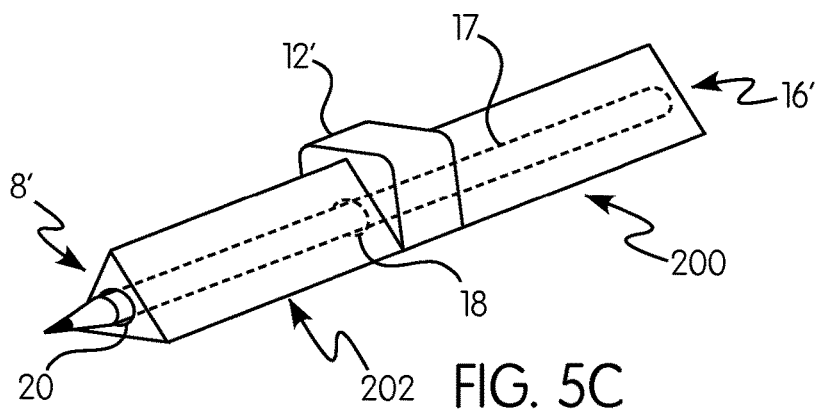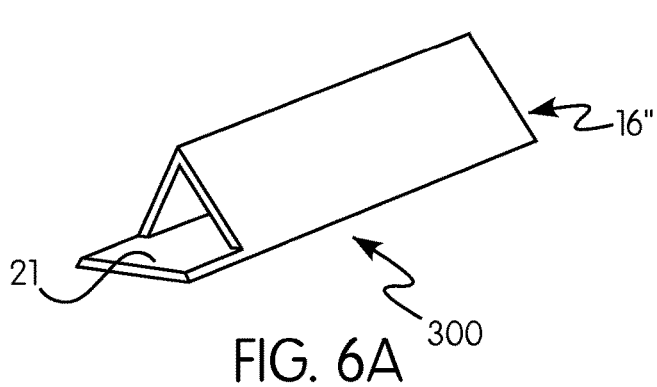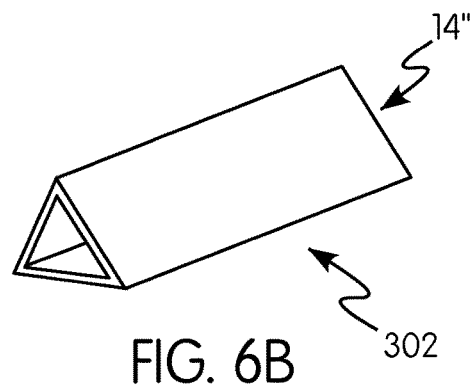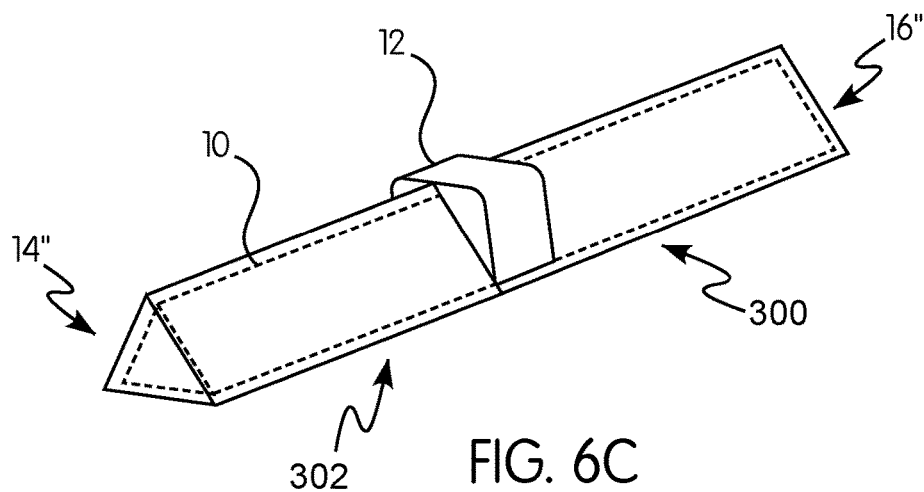

ADAPTIVE WRITING UTENSIL

CROSS-REFERENCE TO RELATED APPLICATION

This application claims priority to U.S. Provisional Application Ser. No. 62/488,348, filed Apr. 21, 2017, which is hereby incorporated by reference in its entirety.

BACKGROUND OF THE INVENTION

Field of the Invention

The present disclosure relates generally to writing utensils. More particularly, the present disclosure relates to a writing utensil adapted to aid a user in the development of a tripod writing grip.

Description of Related Art

There are individuals that are unable to successfully grasp standard writing utensils using a tripod writing grip, or who which may be able to do so only with great difficulty. These individuals may lack muscle, fine motor, or other ability that inhibits their ability to grasp. Often, these individuals are apt to use a power grip, opposed to a standard tripod grip, and such practices may limit their ability to write or draw in an efficient and legible manner and may develop into habits which may hinder the development of a tripod writing grip.

Current devices for promoting a proper writing grip are usually provided as add-ons for standard writing utensils. Such devices generally either provide only limited grip options or do not adequately prevent a user's hand or the device itself from sliding up and down the writing utensil. Accordingly, there is a need for an adaptive writing utensil which addresses some or all of these deficiencies in the prior art.

SUMMARY OF THE INVENTION

In order to address the foregoing issues, a writing utensil is provided which has been adapted for promoting the development of a tripod writing grip. In various examples, the writing utensil may have an elongate body including three faces extending between a proximal end and a distal end thereof and a boss member extending from an intermediate portion thereof, with the boss member being adapted for impeding a user's fingers from sliding along a longitudinal axis of the elongate body.

In various examples, the above-described intermediate portion may be located at approximately the midpoint between the proximal end and distal end of the elongate body. In further examples, the intermediate portion may be located at a distance, in a range from approximately ⅛ to ½ of the total length of the elongate body, from the distal end of thereof. In further examples, the intermediate portion may be located at a distance of approximately ¼ of the total length of the elongate body, from the distal end thereof.

In various examples, the thickness of the boss member may be approximately 1/12 to ⅛ of the total length of the elongate body and/or may be approximately ¼ to ¾ inch.

In various examples, the boss member and the elongate body may be formed as a unitary structure of the same material and/or may be made of at least one of the following wax, charcoal, chalk, grease, or any combination thereof. In further examples, the boss member and elongate body may be made of paraffin wax.

In non-limiting embodiments, each of the proximal end and the distal end of the elongate body may include a marking surface. In various examples the cross section of the elongate body may be substantially triangular, and, in particular, in the form of a substantially equilateral triangle. In various configurations, the boss member may contact only two faces of the elongate body, and a non-contacted face may be substantially flat.

In certain non-limiting embodiments, the elongate body may include a longitudinal cavity adapted for receiving a marking implement, which, in various examples, may include a crayon, a chalk, an ink source, a pencil lead (e.g., a stick of compressed graphite), a computer stylus, or any combination thereof.

In further non-limiting embodiments the marking implement may include a conventional writing utensil adapted for use apart from the writing utensil, such as, in various examples, a pen, a pencil, a marker, a crayon, a computer stylus, or any combination thereof.

In various examples, the distal end of the elongate body may be provided with at least one of the following: an eraser, a thruster configured to actuate an extension and retraction mechanism of the marking implement, or any combination thereof.

In various examples the boss member may be provided such that it is in contact with no more than two faces of the elongate body, and a third face of the elongate body may substantially flat along its entire length.

In various examples, the boss member may have a substantially rectangular cross section extending upward from two bottom edges of the elongate body, wherein a top face of the boss member is even with or extends past a top edge of the elongate body. In other illustrative examples, the boss member may extend around each face of the elongate body, or may extend from only one face of the elongate body. In further examples, the boss member may be bifurcated such that two boss members are provided, each extending from a different face of the elongate body.

In further non-limiting embodiments, at least a portion of the elongate body may include four or more faces. For example, in non-limiting embodiments at least a portion of the elongate body may have a trapezoidal, rhomboidal, pentagonal, hexagonal, heptagonal, octagonal, trapezoidal, rhomboidal, pentagonal, hexagonal, heptagonal, or octagonal cross section.

In further non-limiting embodiments of the present invention, a mold may be provided for forming a writing utensil as described herein. In non-limiting embodiments, the mold may comprise: a plurality of elongate channels, each channel defining at least two cavities extending along a longitudinal axis thereof, wherein each of the at least two cavities corresponds to a shape of the writing utensil, and wherein each of the at least two cavities is separated from at least one adjacent cavity by at least one groove extending along a transverse axis of the plurality of elongate channels.

In further non-limiting embodiments of the present invention, a method may be provided for forming a writing utensil as described herein. In non-limiting embodiments, the method may comprise: providing a mold comprising a plurality of elongate channels, each channel defining at least two cavities extending along a longitudinal axis thereof, wherein each of the at least two cavities corresponds to a shape of the writing utensil, and wherein each of the at least two cavities is separated from at least one adjacent cavity by at least one groove extending along a transverse axis of the plurality of elongate channels; supplying a material for forming at least one of the plurality of writing utensils into at least one of the at least one cavity; and inserting at least one removable spacer into at least one of the at least one groove, such that the at least one removable spacer separates at least one of the at least one cavity from an adjacent one of the at least one cavity. In non-limiting embodiments, the at least one removable spacer may be inserted either before the material is supplied to the at least one cavity or after the material is supplied to the at least one cavity.

These and other features and characteristics of the adaptive writing utensil, as well as, the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIGS. 1A and 1B are front and rear perspective views, respectively, of an adaptive writing utensil in accordance with a non-limiting embodiment of the present disclosure.

FIGS. 2A-2G are front elevational views of seven different non-limiting embodiments of adaptive writing utensils illustrating various potential boss member shapes in accordance with the principles of the present disclosure.

FIG. 5A is a front perspective view of a proximal half of an adaptive holder for a writing utensil in accordance with a non-limiting embodiment of the present disclosure.

FIG. 5B is a front perspective view of a distal half of an adaptive holder for a writing utensil in accordance with the principles of the present disclosure.

FIG. 5C is a front perspective view of an assembled adaptive holder for a writing utensil containing a writing implement therein in accordance with the principles of the present disclosure.

FIG. 6A is a front perspective view of a proximal half of a case for an adaptive writing utensil in accordance with a non-limiting embodiment of the present disclosure.

FIG. 6B is a rear perspective view of a distal half of a case for an adaptive writing utensil in accordance with a non-limiting embodiment of the present disclosure.

FIG. 6C is a front perspective view of an assembled case for an adaptive writing utensil in accordance with a non-limiting embodiment of the present disclosure.

DESCRIPTION OF THE INVENTION

Figure 3A:
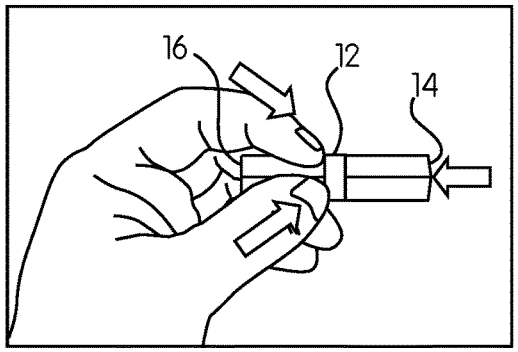
FIGS. 3A-3D are top perspective views of various potential gripping positions in accordance with the principles of the present disclosure.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Unless otherwise indicated, all ranges or ratios disclosed herein are to be understood to encompass any and all sub-ranges or sub-ratios subsumed therein. For example, a stated range or ratio of "1 to 10" should be considered to include any and all sub-ranges between (and inclusive of) the minimum value of 1 and the maximum value of 10, that is, all sub-ranges or sub-ratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities, dimensions, and so forth used in the specification and claims are to be understood as modified in all instances by the term "about." By "about" is meant a range of plus or minus ten percent of the stated value.

In this application, the distal end of a component or of a device is to be understood as meaning the end furthest from the user's hand, and the proximal end is to be understood as meaning the end closest to the user's hand, as illustrated in the applicable drawings. Likewise, in this application, the "distal direction" is to be understood as meaning the direction of the marking end of a writing utensil, and the "proximal direction" is to be understood as meaning the opposite direction to the direction of the marking end, as illustrated in the applicable drawings.

It will be appreciated that in various embodiments of the present invention, the distal end and proximal end of a writing utensil may be substantially identical, interchangeable, and/or otherwise may be both used for marking depending on how the user holds the utensil. As such, the terms "proximal" and "distal" are to be understood to refer to the orientation of the utensil as shown in the applicable drawings unless the context clearly dictates otherwise.

As used herein, geometric terms, such as "polygonal," "triangular," "rectangular," "circular," etc., refer to the general overall shape of an article as perceived by a casual observer and are not to be limited by the mathematical definitions thereof unless the context clearly dictates otherwise. For example, as used herein, a portion of a writing implement may be said to have a "triangular cross section" even if one or more of the edges thereof is rounded, squared off, or otherwise made smooth.

With reference to FIGS. 1A-1B, in accordance with a non-limiting embodiment of the present disclosure, an adaptive writing utensil 100 may include an elongate body 10 having a distal end 14, a proximal end 16, and a boss member 12 located at approximately the midpoint 8 of the elongate body 10. However, it is to be understood that the present invention is not limited to this configuration, and that the boss member may be located at various positions on the elongate body. For example, in non-limiting embodiments, the boss member 12 may be located at a distance from the distal end 14 of approximately ⅛ to ½ of the total length of the elongate body 10. In a non-limiting example, the boss member 12 distance from the distal end 14 of approximately ¼ of the total length of the elongate body 10. Such non-limiting configurations may allow for an increased number of different potential grip positions in embodiments wherein the distal end 14 and proximal end 16 are interchangeable.

In non-limiting embodiments, the thickness of the boss member 12 may be approximately ¼ to ½ inch, or about 1/12 to ⅛ of the total length of the elongate body 10. For example, in a non-limiting embodiment, the boss member 12 may have a thickness of approximately ½ inch, with the total elongate body 10 being approximately 4½ inches long, such that the thickness of the boss member 12 is approximately ⅑ of the total length of the elongate body 10. It will be appreciated that various adjustments may be made in order to accommodate users having different hand sizes.

In the non-limiting embodiment shown in FIGS. 1A-1B, the elongate body 10 has a substantially triangular cross section and the boss member 12 has a substantially rectangular cross section, albeit with rounded corners. In the illustration shown, the boss member 12 may extend from the two bottom edges of the elongate body 10 just past the top edge of the elongate body 10. However, it is to be understood that a variety of potential shapes for the boss member 12 may be utilized in accordance with the present disclosure, for example, those described hereinafter with reference to FIGS. 2A-2G. Further, it is to be understood that a variety of potential shapes of the elongate body 10 may be employed in accordance with the principles of the present invention.

In non-limiting embodiments, at least a portion of the adaptive writing utensil 100 may be formed as a stick of colored wax, charcoal, chalk, grease, or any combination thereof, or may be formed as a computer stylus or other electronic or virtual marking implement. For example, in one non-limiting embodiment, the writing utensil 100 may be formed from colored or otherwise pigmented paraffin wax, and the finished product may be formed as a crayon or wax pastel. It will be appreciated that the present disclosure is not limited to these illustrative examples, and that many types of marking materials known to those skilled in the art may be utilized in accordance with the present invention.

In non-limiting embodiments, the adaptive writing utensil 100, including the boss member 12 and elongate body 10 may be a unitary structure formed of the same material and may be formed together in a single mold, in order to facilitate efficient manufacturing and to produce a unified tactile structure which may be desirable to an end user. In non-limiting embodiments, the adaptive writing utensil 100 may be advantageously formed all or in part from recycled conventional crayons (e.g., pastels made of paraffin wax or like material), which may be melted and formed in an appropriate mold.

However, it is to be understood that the present invention is not solely limited to this embodiment, and various other structures are permissible. For example, in a non-limiting embodiment, the elongate body 10 may be made of paraffin wax or other marking material as described herein and the boss member 12 may be made of plastic, wood, metal, or other durable material and may be affixed to the elongate body 10 using an adhesive, a "snap-fit" mechanism, or any combination thereof.

In non-limiting embodiments utilizing, a snap-fit mechanism, one or more spikes, lugs, or other type of protuberances, may be located on the interior of the boss member 12 to aid the boss member 12 in remaining in place. However, in other non-limiting embodiments utilizing a snap-fit mechanism, a combination of the force exerted on the boss member 12 due to the resiliency of the snap-fit mechanism and the force of friction maybe sufficient to maintain the boss member 12 in its desired position. In certain non-limiting embodiments, the snap-fit mechanism may be such that the boss member 12 may be releasably attached to the elongate body 10 and moved to a desired position along the elongate body 10 to accommodate the needs of individual users.

With continued reference to FIGS. 1A-1B, in the non-limiting embodiment shown, each of the proximal end 16 and distal end 14 forms an identical marking surface, and each may be used interchangeably depending on how a user grasps the instrument. However, this arrangement is not to be understood as limiting, and in various aspects, the proximal end 16 may be provided with an eraser, or an actuator for an internal retractable writing implement, or the like, and the distal end 14 may be provided with a writing tip such as a pen tip, pencil tip, computer stylus tip, marker tip, or similar structure for making a physical or virtual mark.

In the non-limiting embodiment shown, a textured surface 6 is provided on each face of the elongate body 10 to further aid in gripping. As illustrated in FIGS. 1A-1B, the textured surface 6 includes a plurality of small indentations, however a variety of types of texturing may be employed, such as, for example, a plurality of parallel scorings or indentations arranged in a geometric pattern to facilitate gripping.

Additionally, in non-limiting embodiments, a particular texture may be associated with a particular color or type of marking utensil. In such embodiments, the various textures may aid persons with a visual impairment in selecting an appropriate writing utensil for the task at hand. Additionally or alternatively, a plurality of writing utensils may be provided together with different shaped boss members, each associated with a different color or type of utensil.

FIGS. 2A-2G depict front elevational views illustrating potential boss member shapes for an adaptive writing utensil in accordance with non-limiting embodiments of the present disclosure.

In the non-limiting embodiment shown in FIG. 2A, the boss member 12a is provided with a substantially circular cross section and extends above an upper edge of the triangular cross section of the elongate body such that it contacts only two faces 13a, 13b of the elongate body and does not contact the third face 13c.

In the non-limiting embodiment shown in FIG. 2B, the boss member is bifurcated into two separate pieces (12b, 12b'), each having a substantially arcuate cross section, and each extending across the width of one face (13a, 13b, respectively) of the elongate body.

In the non-limiting embodiment shown in FIG. 2C, the boss member 12c extends above an upper edge of the triangular cross section of the elongate body and is provided with three substantially flat exterior surfaces.

In the non-limiting embodiment shown in FIG. 2D, the boss member 12d is provided with an arcuate cross section extending across the width of only one face 13a of the elongate body.

In the non-limiting embodiment shown in FIG. 2E, the boss member 12e has a substantially circular cross section and entirely surrounds the elongate body, contacting each of the faces 13a-c thereof.

In the non-limiting embodiment shown in FIG. 2F, the boss member 12f has a cross section which is similar to that of the non-limiting embodiment shown in FIG. 2E, but which contacts only two sides 13a, 13b of the elongate body.

In the non-limiting embodiment shown in FIG. 2G, the boss member 12 is provided with a substantially rectangular cross section albeit with rounded corners, as in the non-limiting embodiments shown in FIGS. 1A-1B and 5A.

FIGS. 3A-3D depict top perspective views of various potential gripping positions in accordance with non-limiting embodiments of the present invention. In the illustrations shown, the block arrows illustrate stabilizing forces which may aid a user in maintaining a tripod writing grip.

In the non-limiting illustrations shown, the boss member 12 approximately bisects the elongate body, and thus allows for a variety of different gripping positions depending on an individual's particular needs. For example, as shown in FIGS. 3A-3B, a user may grip the utensil near the proximal end 16 and the boss member may prevent the thumb and forefinger (as shown in FIG. 3A) or the forefinger and middle finger (as shown in FIG. 3B) from sliding down the writing utensil, depending on how the writing utensil is oriented.

Figure 3C:
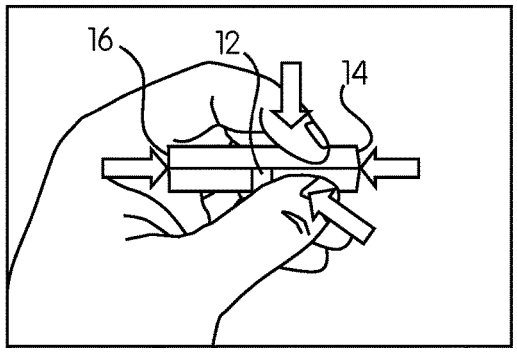
Figure 3B:
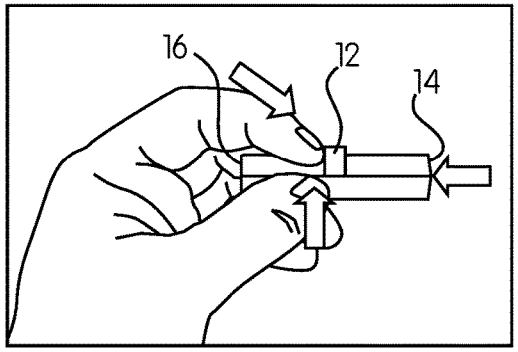
Figure 3D:
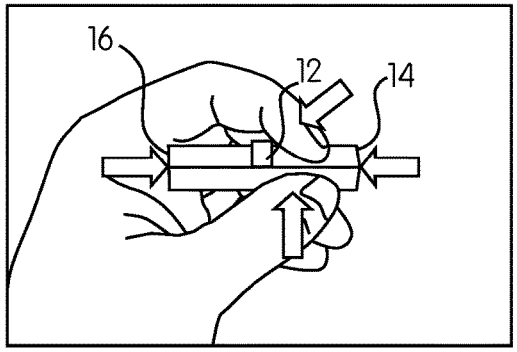

As shown in FIGS. 3C-3D, alternatively, a user may grip the writing utensil near its distal end 14 and the boss member 12 may be used to prevent the writing utensil from falling out of the hand when a user lifts the writing utensil by providing a supporting force against a middle portion of the thumb (as shown in FIG. 3C) or other fingers (as shown in FIG. 3D).

Figure 4A:
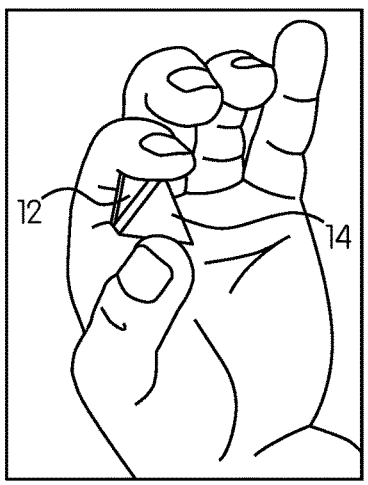
FIGS. 4A-4C are front elevational views of various potential gripping positions in accordance with the principles of the present disclosure.
Figure 4B:
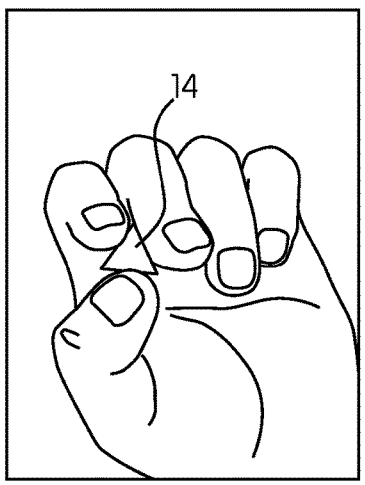
Figure 4C:
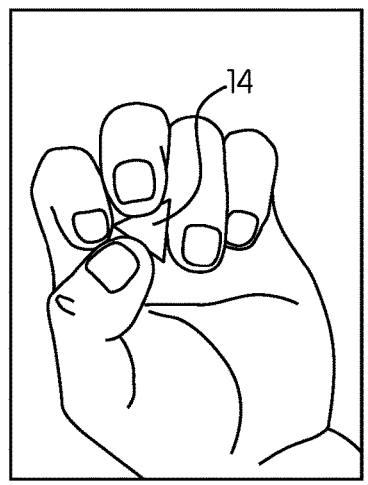

FIGS. 4A-4C depict front elevational views of various gripping positions in accordance with the present disclosure. In various non-limiting embodiments, portions of the adaptive writing utensil may have a substantially triangular cross section, which, in combination with the boss member, may be used to help stabilize the writing utensil and promote the use of a tripod grip.

With reference to FIGS. 5A-5C, in non-limiting embodiments, the present invention may take the form of a holder for a conventional writing utensil or the body of a pen, mechanical pencil, marker, or the like. In various embodiments, the holder may be made of a non-marking material, such as plastic, wood, metal, or other convenient composition.

In the non-limiting embodiment shown in FIGS. 5A-5C, the holder includes a proximal half 200 and a distal half 202, each having a longitudinal void running down the center thereof internally. With reference to FIG. 5A, the proximal portion of the longitudinal void may be accessible via an middle aperture 18 provided on the distal end of the boss member, which, in the non-limiting embodiment shown, is in the vicinity of the midpoint 8 of the assembled writing utensil. In the non-limiting embodiment shown, the middle aperture 18 is adapted to receive a proximal end of a conventional writing implement (17 in FIG. 5C), such as a pen, pencil, crayon, piece of chalk, marker, computer stylus, or the like, in such a way that the conventional writing implement is held in place due to frictional forces.

Optionally, a user may leave the distal end of the conventional writing implement exposed and utilize only the proximal half 200 of the holder. Alternatively, the distal half 202 may be added to form an assembled writing utensil as shown in FIG. 5C, wherein the distal end of the conventional writing implement 17 protrudes through a distal aperture 20 thereof and a substantially triangular gripping surface is provided along a majority of the writing utensil. The proximal half 200 and distal half 202 may be secured together by various attachment mechanisms, such as, for example, one or more corresponding pegs and holes (not shown) in order to prevent the proximal half 200 and distal half 202 from rotating relative to one another when assembled.

FIGS. 6A-6C depict a case for an adaptive writing utensil, such as, for example, the embodiment shown in FIGS. 1A-1B, in accordance with the principles of the present invention. In the illustrations shown, each of a proximal half 300 and a distal half 302 of a case has an interior cross section corresponding to the cross section of the elongate body 10 shown in FIGS. 1A-1B.

As shown in FIG. 6C, the proximal half 300 and distal half 302 may come together around an adaptive writing utensil in order to protect the primary writing surfaces thereof during storage or transportation, but may leave the boss member 12 exposed to facilitate ready identification of the color or type of adaptive writing utensil. With such configurations, a user may optionally use the writing utensil with only one half of the case attached to the adaptive writing utensil.

This provides various benefits, such as limiting the exposure of the hand to a marking surface which may be distally oriented. Further, in particular in embodiments wherein the adaptive writing utensil is in the form of a wax pastel (e.g., a crayon), chalk, or other type of marking implement which wears down with continued use, the case may be used to maintain the tactile feel of the original adaptive writing utensil by providing a triangular cross section on the distally oriented side and may thus extend the life of the adaptive writing utensil.

In the non-limiting embodiment shown, an extension portion 21 corresponding to the thickness of the boss member 12 is provided on one side of the proximal half 300 such that it covers the portion of the elongate body 10 which is opposite to the boss member 12 when the case is in place. In alternative non-limiting embodiments, the length of the extension portion may be split among the proximal half 300 and distal half 302 of the case (e.g., two half-extension portions which come together opposite of the midpoint of the boss member 12), or a gap may be left at this location.

Figure 7A:
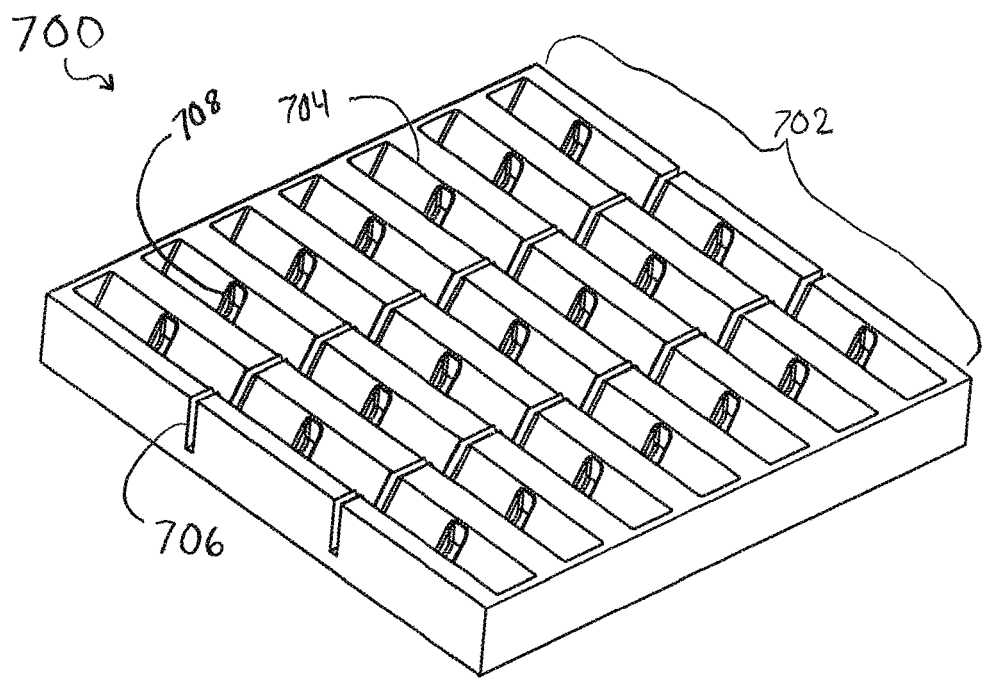
FIG. 7A is a top perspective view of a mold for forming a plurality of adaptive writing utensils in accordance with a non-limiting embodiment of the present disclosure.

Referring now to FIG. 7A, FIG. 7A is a top perspective view of a mold 700 for forming a plurality of adaptive writing utensils in accordance with a non-limiting embodiment of the present disclosure. In the non-limiting embodiment shown, a mold 700 contains a plurality of elongate channels 702, each channel 702 comprising a plurality of cavities 704 arranged along the longitudinal axis thereof, with each cavity 704 being separated from one or more adjacent cavities by a groove 706 running along a transverse axis of the channel 702.

In the non-limiting embodiment shown, each cavity 704 corresponds to the shape of an adaptive writing utensil, as described herein. For example, in the non-limiting embodiment shown, each cavity 704 contains a boss member portion 708 corresponding to the shape of a boss member of an adaptive writing utensil, as described herein, such that a boss member may be formed integrally with each adaptive writing utensil in its respective cavity 704.

Figure 7B:
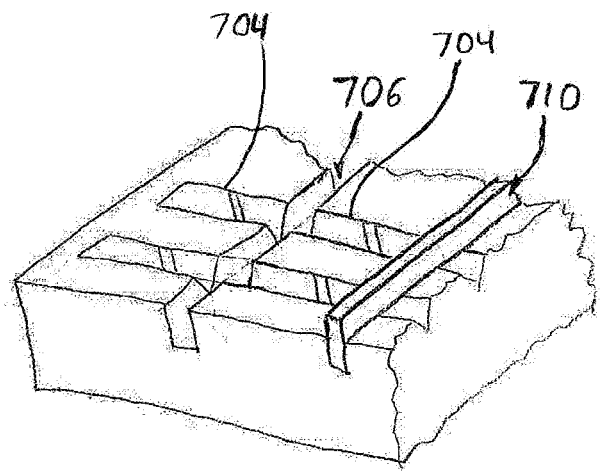
FIG. 7B is a detail view of a corner portion of the mold shown in FIG. 7A, albeit with a removable spacer placed within one of the grooves thereof, in accordance with a non-limiting embodiment of the present disclosure.

Referring now to FIG. 7B, FIG. 7B is a detail view of a corner portion of the mold 700 shown in FIG. 7A, albeit with a removable spacer 710 placed in one of the grooves 706 thereof. As illustrated in FIG. 7B, a removable spacer 710 may be placed in a groove 706 of the mold 700 in order to separate each cavity 704 from one or more adjacent cavities in its respective channel 702 during the manufacturing of a plurality of adaptive writing utensils.

In non-limiting embodiments, removable spacers 710 may be placed in each groove 706 prior to filling the mold 700 with a forming material (e.g., paraffin wax) for forming adaptive writing utensils, such that each cavity 704 may be filled separately. Such non-limiting embodiments may allow for multiple different adaptive writing utensils made of different materials (e.g., different colors of paraffin wax) to be formed at once in a single mold 700.

In other non-limiting embodiments, the forming material may be supplied (e.g., poured into or injected into) to the entire mold 700 at once, and the removable spacers 710 may be emplaced during formation of the adaptive writing utensils such that they displace the forming material from the grooves 706 and thus separate each adaptive writing utensil from any adjacent adaptive writing utensils in its respective channel during formation. Such non-limiting embodiments may allow for more efficient manufacture of a number of adaptive writing utensils made of the same forming material by reducing the number of instances in which forming material is introduced into the mold (e.g., by allowing for one large pouring or injection of forming material per use of the mold rather than requiring multiple smaller pourings or injections).

Although the invention has been described in detail for the purpose of illustration based on what are currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A writing utensil adapted for promoting the development of a tripod writing grip, comprising:
    an elongate body comprising three faces extending between a proximal end and a distal end of the elongate body; and
    a boss member extending from an intermediate portion of the elongate body, the boss member being configured for impeding a user's fingers from sliding along a longitudinal axis of the elongate body,
    wherein the boss member extends from only two adjacent sides of the elongate body.

2. The writing utensil according to claim 1, wherein:
    the intermediate portion is located at approximately the midpoint between the proximal end and distal end of the elongate body.

3. The writing utensil according to claim 1, wherein the thickness of the boss member is approximately 1/12 to 1/8 of the total length of the elongate body.

4. The writing utensil according to claim 1, wherein:
    the intermediate portion is located at a distance from the distal end of the elongate body, the distance being in a range from approximately 1/8 to 1/2 of the total length of the elongate body.

5. The writing utensil according to claim 4, wherein the distance is approximately 1/4 of the total length of the elongate body.

6. The writing utensil according to claim 1, wherein the thickness of the boss member is approximately 1/4 to 3/4 inch.

7. The writing utensil according to claim 1, wherein:
    the boss member and the elongate body are formed as a unitary structure of the same material, the material comprising at least one of the following: wax, charcoal, chalk, grease, or any combination thereof, and
    each of the proximal end and the distal end of the elongate body comprises a marking surface.

8. The writing utensil according to claim 7, wherein the boss member and the elongate body are made of paraffin wax.

9. The writing utensil according to claim 1, wherein the cross section of the elongate body is substantially triangular.

10. The writing utensil according to claim 9, wherein the boss member contacts only two faces of the elongate body, with the remaining face being substantially flat.

11. The writing utensil according to claim 9, wherein the boss member contacts each of the three faces of the elongate body.

12. The writing utensil according to claim 1, wherein:
    the elongate body comprises a longitudinal cavity adapted for receiving a marking implement, and
    the marking implement comprises a crayon, a chalk, an ink source, a pencil lead, a computer stylus, or any combination thereof.

13. The writing utensil according to claim 12, wherein the marking implement is adapted for use apart from the writing utensil.

14. The writing utensil according to claim 1, wherein the distal end comprises at least one of the following: an eraser, a thruster configured to actuate an extension and retraction mechanism of the marking implement, or any combination thereof.

15. The writing utensil according to claim 1, wherein the boss member is in contact with no more than two faces of the elongate body, and wherein a third face of the elongate body is substantially flat along the entire length of the elongate body.

16. The writing utensil according to claim 15, wherein the boss member has a substantially rectangular cross section extending upward from two bottom edges of the elongate body, wherein a top face of the boss member is even with or extends past a top edge of the elongate body.

17. The writing utensil according to claim 1, wherein the boss member extends from only one face of the elongate body, the writing utensil further comprising a second boss member extending from a second face of the elongate body.

18. The writing utensil according to claim 1, wherein at least a portion of the elongate body has at least one of the following cross sections: triangular, trapezoidal, rhomboidal, pentagonal, hexagonal, heptagonal, octagonal, or any combination thereof.

* * * * *